(12) United States Patent
Ohtsuka et al.

(10) Patent No.: US 6,177,524 B1
(45) Date of Patent: Jan. 23, 2001

(54) BLOCK COPOLYMER HAVING (METH) ACRYLOYL GROUPS IN SIDE CHAINS AND COMPOSITION CONTAINING THE SAME

(75) Inventors: Yoshihiro Ohtsuka, Hiroshima; Kouichi Okumura, Chiba, both of (JP)

(73) Assignee: Daicel Chemical Industries Ltd. (JP)

( * ) Notice: Under 35 U.S.C. 154(b), the term of this patent shall be extended for 0 days.

(21) Appl. No.: 09/171,612

(22) PCT Filed: Mar. 4, 1998

(86) PCT No.: PCT/JP98/00887

§ 371 Date: Oct. 22, 1998

§ 102(e) Date: Oct. 22, 1998

(87) PCT Pub. No.: WO98/39366

PCT Pub. Date: Sep. 11, 1998

(30) Foreign Application Priority Data

Mar. 5, 1997 (JP) .................................................. 9-067292

(51) Int. Cl.$^7$ .................................................. C08F 283/10
(52) U.S. Cl. .................. 525/531; 525/332.9; 525/387
(58) Field of Search .................. 525/530, 531, 525/332.9, 387

(56) References Cited

U.S. PATENT DOCUMENTS

| | | |
|---|---|---|
| H1482 | 9/1995 | St. Clair et al. . |
| 3,892,819 | 7/1975 | Najvar . |
| 4,051,199 | 9/1977 | Udipi et al. . |
| 5,300,586 * | 4/1994 | Bening et al. ................ 525/332.8 |

FOREIGN PATENT DOCUMENTS

| | | |
|---|---|---|
| 371 697B1 | 6/1990 | (EP) . |
| 516 203 A2 | 12/1992 | (EP) . |
| 0 564 050 B1 | 10/1993 | (EP) . |
| 564 246 A2 | 10/1993 | (EP) . |
| 353 471 B1 | 1/1994 | (EP) . |
| 50-119891 | 3/1974 | (JP) . |
| 6-25324 | 2/1994 | (JP) . |

\* cited by examiner

*Primary Examiner*—Robert Dawson
*Assistant Examiner*—D. Aylward
(74) *Attorney, Agent, or Firm*—Nixon & Vanderhye P.C.

(57) ABSTRACT

A block copolymer having (meth)acryloyl groups in side chains, which copolymer is a ring-opening addition product of (meth)acryloyl-group-containing carboxylic acid to epoxy groups of a block copolymer obtained through epoxidation of double bonds derived from a conjugated diene compound contained in a base block copolymer formed of a polymer block of an aromatic vinyl compound and that of a conjugated diene compound; as well as adhesive compositions, sealant compositions, coating compositions, and sizing compositions.

10 Claims, No Drawings

BLOCK COPOLYMER HAVING (METH) ACRYLOYL GROUPS IN SIDE CHAINS AND COMPOSITION CONTAINING THE SAME

TECHNICAL FIELD

The present invention relates to block copolymers having (meth)acryloyl groups in side chains, and to compositions containing the same. More particularly, the present invention relates to block copolymers having (meth)acryloyl groups in side chains that enable provision of hardened film exhibiting excellent adhesion to a substrate, solvent resistance, and gloss, when the copolymers are irradiated with an active energy beam such as a UV beam or an electron beam, and to compositions containing the same.

BACKGROUND ART

Conventionally, active-energy-beam-hardened type resin compositions, which are hardened through irradiation with an active energy beam such as a UV beam or an electron beam, have been practically used in the field of printing inks; the field of coatings for plastic products, metallic products, furniture, and other products; the field of electrical insulation, e.g., insulating varnishes, insulating sheets, laminated boards, printed substrates, resist inks, and semiconductor-sealing agents; and other fields including the fields of adhesives, sealants, sizing agents for paper making, and lining materials. The resin compositions are utilized in such a variety of fields because they have the following advantages: (1) solvent-free and low environmental pollution; (2) remarkably high hardening speed to provide enhanced productivity of corresponding products; (3) remarkably low change in volume before and after hardening due to hardening as 100% solid matter; and (4) wide range of on-going development for coatings for plastics, paper, and inorganic materials; adhesives; and sealants due to low thermal loss by substrate materials or no thermal influence to substrate materials.

For example, epoxy (meth)acrylate resins which are obtained through ring-opening reaction of acrylic acid or methacrylic acid with epoxy groups of an epoxy resin are widely used as energy-beam-hardened type coatings, inks, and adhesives having the above-described characteristics. However, these widely used epoxy (meth)acrylate resins have disadvantages such as high degree of hardness and brittleness or high degree of shrinkage during hardening. For example, in the case in which such a resin is used as a printing ink for paper, printed ink generates cracks when the printed paper is folded. Also, in the case in which the resin is used as a coating for metal sheets of iron, aluminum, etc., the resultant film may easily generate cracks due to brittleness when the coated metal sheets is subjected to bend-processing to result in an unsuccessful processing, or adhesion of the coating to the metal sheets of iron, aluminum, etc. may sometimes be poor.

To overcome the disadvantages of such active-energy-beam-hardened type epoxy (meth)acrylate resins and active-energy-beam-hardened type epoxy resins, an object of the present invention is to provide block copolymers for hardenable resin compositions which provide a coating film exhibiting appropriate flexibility and exhibiting excellent adhesion, water resistance, and heat resistance, and remarkably excellent solvent resistance and gloss, and to provide a variety of hardenable resin compositions containing the copolymers.

DISCLOSURE OF THE INVENTION

In view of the foregoing, the present inventors have conducted earnest studies in order to provide block copolymers and hardenable resin compositions containing the same which meet to the above objects, and have found that block copolymers having (meth)acryloyl groups in side chains and compositions containing the copolymers exhibit hardenability and appropriate flexibility and exhibit excellent adhesion, water resistance, and heat resistance, and that the compositions provide a coating film having remarkably excellent solvent resistance and gloss. The present invention was accomplished based on this finding.

To solve the above problems, in one aspect of the present invention, there is provided a block copolymer having (meth)acryloyl groups in side chains, which copolymer is a ring-opening addition product of (meth)acryloyl-group-containing carboxylic acid to epoxy groups of a block copolymer obtained through epoxidation of double bonds derived from a conjugated diene compound contained in a base block copolymer formed of a polymer block of an aromatic vinyl compound and that of a conjugated diene compound.

The present invention also provides a block copolymer having (meth)acryloyl groups in side chains according to the first aspect of the present invention, wherein the conjugated diene compound contained in the epoxidized block copolymer is butadiene and/or isoprene.

The present invention also provides a block copolymer having (meth)acryloyl groups in side chains according to the first aspect of the present invention, wherein the epoxidized block copolymer has conjugated-diene-derived double bonds that are partially hydrogenated.

The present invention also provides a block copolymer having (meth)acryloyl groups according to the side chains in the first aspect of the present invention, wherein the epoxidized block copolymer is obtained by adding a (meth)acryloyl-group-containing carboxylic acid in an amount of 0.9–2.0 equivalents per equivalent of epoxy groups.

The present invention also provides a block copolymer having (meth)acryloyl groups in side chains according the first aspect of the present invention, wherein the (meth) acryloyl-group-containing carboxylic acid is selected from the compound group consisting of methacrylic acid, acrylic acid, 2-acryloyloxyethyl hydrogen phthalate, 2-acryloyloxypropyl hydrogen phthalate, 2-acryloyloxypropylhexahydro hydrogen phthalate, 2-acryloyloxypropyltetrahydro hydrogen phthalate, β-methacryloyloxyethyl hydrogen succinate, β-acryloyloxyethyl hydrogen succinate, and compounds represented by the following formulas (1) and (2):

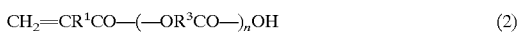

{wherein $R^1$ represents hydrogen or a methyl group; each of $R^2$, $R^3$, and $R^4$ represents a $C_{1-10}$ aliphatic hydrocarbon group; and each of m and n represents an integer between 1 and 10 inclusive}.

The present invention also provides a block copolymer having (meth)acryloyl groups in side chains according to the first aspect of the present invention, wherein the (meth) acryloyl-group-containing carboxylic acid is monocarboxylic acid.

The second through fifth aspects of the present invention provide an adhesive composition, a sealant composition, a coating composition, and a sizing composition, respectively, containing the block copolymer having (meth)acryloyl groups in side chains according to the first aspect of the present invention.

BEST MODE FOR CARRYING OUT THE INVENTION

The present invention will next be described in detail.

The block copolymer having (meth)acryloyl groups in side chains according to the present invention comprises a base block copolymer containing a polymer block A predominantly formed of an aromatic vinyl compound, and a polymer block B predominantly formed of a conjugated diene compound. The copolymerization ratio of the vinyl aromatic compound to the conjugated diene compound in the base block copolymer is preferably $5/95-70/30$ as a weight ratio, with $10/90-60/40$ being particularly preferred. The base block copolymer has a number average molecular weight of 5000–500000, preferably 10000–200000, and has a molecular weight distribution [the ratio of weight average molecular weight (Mw) to number average molecular weight (Mn); i.e., (Mw/Mn)] of 10 or less. The molecular structure of the base block copolymer may be linear, branched, radial, or an arbitrary combination thereof. Examples of the polymer include vinyl aromatic compound-conjugated diene copolymers having a structure such as A-B-A, A-B, B-A-B-A, $(A-B-)_4Si$, or A-B-A-B-A. Moreover, the base block copolymer contains a conjugated diene compound of which unsaturated bonds may be partially hydrogenated.

Examples of the vinyl aromatic compounds which constitute the base block copolymer include one or more species selected from styrene, α-methylstyrene, vinyltoluene, p-tert-butylstyrene, divinylbenzene, p-methylstyrene, and 1,1-diphenylstyrene, with stryene being preferred. As to the conjugate diene compounds which may be used, one, two, or more species may be selected from among butadiene, isoprene, 1,3-pentadiene, 2,3-dimethyl-1,3-butadiene, piperylene, 3-butyl-1,3-octadiene, and phenyl-1,3-butadiene. Of these, butadiene, isoprene, and a combination of butadiene and isoprene are preferred.

No particular limitation is imposed on the method for producing the base block copolymers so long as they have the above-described structure. For example, vinyl aromatic compound-conjugated diene compound block copolymers may be produced in an inert solvent in the presence of a lithium catalyst through methods described in Japanese Patent Publication (kokoku) Nos. 40-23798, 43-17979, 46-32415, and 56-28925. Moreover, block copolymers having a partially hydrogenated conjugated diene block may be produced by hydrogenating in an inert solvent in the presence of a hydrogenation catalyst through methods described in Japanese Patent Publication (kokoku) Nos. 42-8704 and 43-6636 or Japanese Patent Application Laid-Open (kokai) No. 59-133203.

In order to obtain the block copolymers having (meth)acryloyl groups in side chains according to the present invention, the above-described base block copolymers are epoxidized to convert to epoxy-modified block copolymers.

The epoxy-modified block copolymers may be easily obtained by reacting the above base block copolymers with an epoxidizing agent such as a hydroperoxide or a peracid in an inert solvent. Examples of the hydroperoxide include hydrogen peroxide, tert-butyl hydroperoxide, and cumene peroxide. Examples of the peracid include performic acid, peracetic acid, perbenzoic acid, and trifluoroperacetic acid. Of these, peracetic acid is preferred in that it is industrially produced on a large scale, is available at low cost, and has high stability.

When the base block copolymer is epoxidized with an expoxidizing agent, a catalyst may optionally be used. For example, when a peracid is used as an epoxidizing agent, alkalis such as sodium carbonate and acids such as sulfuric acid may be used. When a hydroperoxide is used as an epoxidizing agent, catalysis effect may be provided by a combination of tungstic acid and sodium hydroxide with hydrogen peroxide; that of tungstic acid and sodium hydroxide with an organic acid and hydrogen peroxide; or molybdenum hexacarbonyl with tert-butyl hydroperoxide.

No particular limitation is imposed on the amount of the epoxidizing agent, and a suitable amount according to each case depends on factors such as species of raw block copolymers; epoxidizing agent used; desired epoxidation degree; inert solvents used during epoxidation; and temperature during epoxidation. Inert solvents may be used in order to decrease viscosity of raw materials, stabilize reaction through dilution of epoxidizing agent, etc. When peracetic acid is used as the epoxidizing agent, aromatic compounds, ethers, and esters may be used. Examples of the particularly preferable solvent include hexane, cyclohexane, toluene, benzene, ethyl acetate, carbon tetrachloride, and chloroform.

No particular limitation is imposed on the reaction conditions for epoxidation. The reaction temperature range is determined by reactivity of the employed epoxidizing agent. For example, when peracetic acid is used as the epoxidizing agent, the reaction temperature is determined between 0° C. and 70° C. When the temperature is below 0° C., the rate of reaction decreases, whereas when it is higher than 70° C., peracetic acid may easily decompose. Both cases are disadvantageous. When a tert-butyl hydroperoxide/molybdenum dioxide diacetylacetonate system is used as the epoxidizing agent, the reaction temperature within the range of 20° C. to 150° C. is preferred based on the same reason. No particular operation is required during reaction, and, for example, a raw mixture may be stirred with heating for 2–10 hours. After completion of epoxidiation, the resultant epoxy-modified copolymer may be isolated through a method such as (i) precipitation in a poor solvent; (ii) introduction of the polymer in hot water under stirring and removal of the solvent by distillation; or (iii) direct removal of the solvent.

Subsequently, a (meth)acryloyl-group-containing carboxylic acid, preferably mono(meth)acryloyl-group-containing carboxylic acid, is added in a ring-opening manner to epoxy groups of the above-described epoxy-modified block copolymers in order to obtain the block copolymers having (meth)acryloyl groups in side chains according to the present invention. The block copolymers having (meth) acryloyl groups in side chains obtained by adding a (meth) acryloyl-group-containing carboxylic acid to epoxy groups of the epoxy-modified block copolymers may hereinafter be referred to as simply "addition-modified block copolymers."

(Meth)acryloyl-group-containing carboxylic compounds may be used as carboxylic acids having a (meth)acryloyl group during production of addition-modified block copolymers. Specific examples include methacrylic acid, acrylic acid, 2-acryloyloxyethyl hydrogen phthalate, 2-acryloyloxypropyl hydrogen phthalate, 2-acryloyloxypropylhexahydro hydrogen phthalate, 2-acryloyloxypropyltetrahydro hydrogen phthalate, β-methacryloyloxyethyl hydrogen succinate, β-acryloyloxyethyl hydrogen succinate, and a compound represented by either of the following formulas (1) or (2):

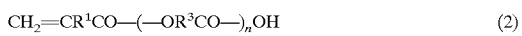

{wherein $R^1$ represents hydrogen or a methyl group; each of $R^2$, $R^3$, and $R^4$ represents a $C_{1-10}$ aliphatic hydrocarbon group; and each of m and n represents an integer between 1 and 10 inclusive}.

Specific examples of the compounds represented by formula (1) include hydroxyalkyl (meth)acrylates such as 2-hydroxyethyl (meth)acrylate, 2-hydroxypropyl (meth)acrylate, 2-hydroxybutyl (meth)acrylate, or 2-hydroxypentyl (meth)acrylate; which are subsequently modified with δ-valerolactone, β-methyl-δ-velerolactone, ε-caprolactone, 3,3,5-trimethylcaprolactone, 3,5,5-trimethylcaprolactone, etc. and thereafter a formed terminal hydroxyl group is further modified with polybasic acid or polybasic acid anhydride. These compounds may be used singly or in combination of two or more species.

Specific examples of the compounds represented by formula (2) include monocarboxylic acids having a (meth)acryloyl group, which are subsequently modified with δ-valerolactone, β-methyl-δ-velerolactone, ε-caprolactone, 3,3,5-trimethylcaprolactone, or 3,5,5-trimethylcaprolactone. These compounds may be used singly or in combination of two or more species.

These (meth)acryloyl-group-containing carboxylic acids are used in an amount of 0.9–2.0 equivalents per equivalent of epoxy groups of the epoxy-modified block copolymers, preferably 0.95–1.3 equivalents. When the amount is less than 0.9 equivalents, a number of epoxy groups remain to affect storage stability of addition-modified block copolymers to be obtained, and product compositions containing the same, whereas when the amount is in excess of 2.0 equivalents, alkali resistance of the addition-modified block copolymers and hardened coating films obtained from a product composition containing the same becomes poor.

The addition reaction between epoxy groups of epoxy-modified block copolymers and a (meth)acryloyl-group-containing carboxylic acid may be carried out through a customary method. For example, reaction may be carried out by mixing a solvent, an epoxy ring-opening addition catalyst, and an optional polymerization inhibitor and allowing the mixture to react at 50–150° C. under stirring. When the reaction temperature is less than 50° C., reaction time increases to result in low productivity, whereas it is in excess of 150° C., gelation may easily occur during reaction. Both cases are disadvantageous. When such ring-opening reaction of a compound having an unsaturated group is carried out, the reaction is preferably carried out in the presence of a molecular-oxygen-containing gas to prevent gelation. Air is generally used as the molecular-oxygen-containing gas, and is blown into a reactor.

Examples of the epoxy ring-opening addition catalyst include tertiary amines such as dimethylbenzylamine, triethylamine, tetramethylethylenediamine, or tri-n-octylamine; quaternary ammonium salts such as tetramethylammonium chloride, tetramethylammonium bromide, or tetrabutylammonium bromide; alkylureas such as tetramethylurea; alkylguanidines such as tetramethylguanidine; phosphines such as triphenylphosphine; and salts thereof. The above-described catalysts may be used singly or in combination of two or more species. The catalysts are used in an amount of 0.01–10 wt. % based on an epoxidated block copolymer, preferably 0.5–3.0 wt. %. When the amount is less than 0.01 wt. %, the catalysis effect is poor. There is no need to add the catalysts in an amount of more than 10 wt. %.

Examples of the solvents which may be used for epoxy ring-opening reaction include aromatic hydrocarbons such as benzene, toluene, or xylene; alcohols such as methanol, ethanol, or 2-propanol; ketones such as acetone, methyl ethyl ketone, or methyl isobutyl ketone; ethers such as diethyl ether, dibutyl ether, or dioxane; esters such as ethyl acetate, isobutyl acetate, ethylene glycol monoacetate, propylene glycol monoacetate, or dipropylene glycol monoacetate; ethylene glycol monoalkyl ethers; diethylene glycol monoalkyl ethers; propylene glycol monoalkyl ethers; dipropylene glycol monoalkyl ethers; butylene glycol monoalkyl ethers; ethylene glycol dialkyl ethers; diethylene glycol dialkyl ethers such as diethylene glycol dimethyl ether or diethylene glycol diethyl ether; ethylene glycol monoalkyl ether acetates; diethylene glycol monoalkyl ether acetates; amides such as dimethylformamide or dimethylacetamide; and halohydrocarbons such as tetrachlorocarbon or chloroform. These solvents may be used alone or as a mixture.

After completion of epoxy ring-opening addition, the resultant addition-modified block copolymer is isolated. examples of the method for isolating the resultant addition-modified block copolymer include (i) precipitation in a poor solvent; (ii) introduction of the polymer in hot water under stirring and removal of the solvent by distillation; and (iii) direct removal of the solvent.

The present inventors have conducted an experiment to conclude that the preferable amount of a (meth)acryloyl group in the addition-modified block copolymer is 0.1–5 mg-equivalents per gram of the addition-modified block copolymer.

In order for the addition-modified block copolymer or a hardenable resin composition containing the same to exhibit excellent flexibility and elasticity after hardening in order to serve as adhesives, sealant compositions, or coating compositions, the most useful polymer preferably contains a (meth)acryloyl group in an amount of 0.2–3.0 mg-equivalents per gram of the polymer.

The addition-modified block copolymers according to the present invention are utilized for a variety of uses based on the property that they are hardened (cross-linked) through irradiation with active energy beams such as a UV beam or an electron beam. When the addition-modified block copolymers are utilized as a final product, additives such as a photo-polymerization initiator, a photo-sensitizer, a reactive diluent, or a cross-linking agent are preferably incorporated therein.

The photo-polymerization initiator and the photo-sensitizer may be incorporated singly or in combination. Examples of the photo-polymerization initiator include benzophenone, acetophenone benzyl, benzyl methyl ketone, benzoin, benzoin methyl ether, benzoin ethyl ether, benzoin isopropyl ether, dimethoxy acetophenone, dimethoxyphenyl acetophenone, diethoxy acetophenone, diphenyl disulfite, and a salt of diaryliodonium, alkoxy-substituted diaryliodonium, triarylsulfonium, dialkylphenacylsulfonium, and dialkyl-4-hydrophenylsulfonium. These may be used singly or in combination of two or more species.

A photo-sensitizer enhances conversion of absorbed energy of an active energy beam to a polymerization-initiating free radical. Examples of the photo-sensitizer include thioxanthone, thioxanthone halide, alkyl derivatives of thioxanthone, anthracene, perylene, tetracene, phenothiadione, 1,2-benzoanthracene, coronene, and tertiary amines. These photo-sensitizers are used in an amount or 0.01–5.0 wt. % based on a block copolymer having a (meth)acryloyl group in side chains, preferably 0.05–3.0 wt. %. When the amount is less than 0.01 wt. %, the effect thereof is poor, whereas when it is in excess of 5.0 wt. %, the molecular weight of the formed polymer increases excessively. Both cases are disadvantageous. It is important to select a photo-polymerization initiator and a photo-sensitizer that are suitable for a polymer to be cross-linked and a usable active energy beam.

The reactive diluent in the description is defined as a substance which reduces the concentration of an addition-modified block copolymer contained in a product composition, allows homogeneous polymerization reaction induced through an active energy beam, and in itself is responsible for hardening reaction.

Examples of acrylic acid esters and methacrylic acid esters which may be used include (meth)acrylic acid alkyl esters such as methyl (meth)acrylate, ethyl (meth)acrylate, propyl (meth)acrylate, butyl (meth)acrylate, pentyl (meth)acrylate, or hexyl (meth)acrylate; (meth)acrylic acid esters having a hydroxyl group such as 2-hydroxyethyl (meth)acrylate, hydroxypropyl (meth)acrylate, hydroxybutyl (meth)acrylate, or caprokactone-modified 2-hydroxyethyl (meth)acrylate; (meth)acrylates such as methoxydiethylene glycol (meth)acrylate, ethoxydiethylene glycol (meth)acrylate, isooctyloxydiethylene glycol (meth)acrylate, phenoxytriethylene glycol (meth)acrylate, methoxytriethylene glycol (meth)acrylate, or methoxypolyethylene glycol #400-(meth)acrylate; bifunctional (meth)acrylic acid esters such as 1,6-hexanediol di(meth)acrylate or neopentyl glycol di(meth)acrylate; and trifunctional (meth)acrylic acid esters such as trimethylolpropane tri(meth)acrylate.

Examples of radically polymerizable prepolymers or oligomers include (meth)acrylic acid esters of polyester-polyol; (meth)acrylic acid esters of polyether-polyol; polyepoxy-(meth)acrylic acid adducts; and resins obtained by introducing a hydroxy (meth)acrylate to polyol via polyisocyanate.

The above-described polymerizable monomers or ologomers are used in an amount of 0–300 parts by weight based on 100 parts of an addition-modified block copolymer. When the reactive diluent is contained in an amount of more than 300 parts by weight, characteristics of the addition-modified block copolymer deteriorate disadvantageously. The particularly preferable amount lies in the range of 0–100 parts by weight.

Examples of epoxides of polymerizable prepolymers and oligomers epoxidized include bisphenol A epoxy resins, bisphenol S epoxy resins, bisphenol F epoxy resins, phenol novolak epoxy resins, cresol novolak epoxy resins, N-glycidyl epoxy resins, alicyclic epoxy resins, epoxidized soy bean oil, and epoxidized linseed oil. More specific examples include 4-vinylcyclohexene-1-oxide, 5-vinylbicyclo[2.2.1]hept-2-ene-2-oxide, limonene monooxide, trivinylcyclohexane monooxide, divinylbenzene monooxide, butadiene monooxide, and 1,2-epoxy-9-decene. Examples of commercial products thereof include AOE X24, AOE X68, and AOE Y08 (products of Daicel Chemical Industries, Ltd.). There may also be used ethylene oxide, propylene oxide, cyclohexyl oxide, styrene oxide, and vinylcyclohexene dioxide.

There may optionally be used epoxy compounds having two or more alicyclic epoxy groups. Examples of commercial products thereof include CELLOXIDE 2021, CELLOXIDE 2021P, CELLOXIDE 2081, CELLOXIDE 2083, and CELLOXIDE 2085 (products of Daicel Chemical Industries, Ltd.). The examples further include aliphatic cyclic epoxy compounds of adipic acid esters such as ERL 4289, ERL 4299 (products of Union Carbide Co.), EPOLEAD GT400, EPOLEAD GT401, or EPOLEAD GT403 (products of Daicel Chemical Industries, Ltd.). The above-described epoxides having one or more epoxy groups may be used singly or in combination of two or more species.

These epoxy compounds are used in a required amount such as 0–100 parts by weight based on 100 parts by weight of an addition-modified block copolymer. When the amount of the epoxy compounds is in excess of 100 parts by weight, characteristics of the addition-modified block copolymer deteriorate.

A cross-linking agent facilitates chemical crosslinking of addition-modified block copolymers. Examples of the cross-linking agent include sulfur compounds such as sulfur dichloride, morpholine disulfide, or alkylphenol disulfide; oximes such as p-quinone dioxime, tetrachloro-p-benzoquinone, or p,p-dibenzoyldiquinone dioxime; nitro compounds such as poly-p-dinitrosobenzene, bis-nitroso-4-phenyl-1,4-piperazine, or N-(2-methyl-2-nitropropyl)-4-nitrosoaniline; and organic peroxides such as t-butyl peroxide, cumene hydroperoxide, t-butylcumyl peroxide, dicumyl peroxide, 2,5-dimethyl-2,5-di(t-butylperoxy) hexane, 2,5-dimethyl-2,5-di(t-butylperoxy)hexyne-3,1,3-bis (t-butylperoxyisopropyl)benzene, 1,1-bis(t-butylperoxy)-3, 3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butylperoxy benzoate, t-butylperoxyisopropyl carbonate, and t-butyl perbenzoate.

The addition-modified block copolymers according to the present invention are mixed with the above components in accordance with an object of use by selecting an appropriate species and amount and other, optional additives, to thereby provide a product composition. The composition is applied to a substrate and cross-linked (hardened). A UV beam of 100–400 nm or an electron beam obtained from a light source such as a high-pressure mercury lamp or a metal halide lamp may be utilized as an active energy beam source which allows cross-linking of the product composition.

The cross-linkable compositions containing the addition-modified block copolymer(s) according to the present invention are particularly useful as adhesives (including pressure-sensitive adhesives, touch-pressure adhesives, laminating adhesives, and assembly adhesives), sealants, coating agents, films (requiring heat resistance and solvent resistance), etc. Other additives which may be incorporated during production of the cross-linkable compositions from the addition-modified block copolymers) according to the present invention are selected to match characteristics required for individual use. Of these, tackifiers, plasticizers, fillers, solvents, and stabilizers are typical additives, which may be incorporated in combination.

When the use of the cross-linkable compositions containing the addition-modified block copolymer(s) according to the present invention is intended towards adhesives or sealants, adhesion-promoters or tackifying resins that are able to be admixed with the addition-modified block copolymer component may sometimes be required. Examples of the tackifying resins include diene-olefin copolymers containing piperylene, hydrogenated rosin, rosin esters, polyterpenes, terpene-phenol resins, polymerized mixed olefins, cumarone-indene resins, polystyrene resins, vinyltoluene-α-methylstyrene copolymers, and polyindene resins. The incorporation amount of the tackifying resins depends on the species thereof, and they are added in an amount of 10–400 parts by weight based on 100 parts of an addition-modified block copolymer, preferably 20–350 parts by weight.

When the cross-linkable composition containing the addition-modified block copolymer according to the present invention is to be used as an adhesive, plasticizers or compounding oil for rubber may be incorporated. Compounding oil for rubber, which is generally known to persons skilled in the art, is oil such as oil containing a large amount of saturated compound or oil containing a large amount of an aromatic compound. The incorporation amount of the compounding oil for rubber depends on the species thereof, and the compounding oil is added in an amount of 0–500 parts by weight based on 100 parts of an addition-modified block copolymer, preferably 1–100 parts by weight, particularly preferably 5–60 parts by weight.

When the cross-linkable composition containing the addition-modified block copolymer according to the present invention is to be used as an adhesive composition, it may be used in a variety of forms such as laminating adhesives, pressure-sensitive adhesives, banding layers, hot-melt adhesives, adhesives dispersed in a solvent, and adhesives dispersed in water. Simple adhesives are formed exclusively of an addition-modified block copolymer; more generally, adhesives are compositions comprising an addition-modified block copolymer as an effective component and other known components for adhesive compositions. In the case of the latter composition, examples of a preferred method for incorporating a variety of components include (i) blending at 50° C.–200° C. for three hours or less until the mixture thermally fused to yield a homogeneous mixture; (ii) dissolving each component to be incorporated in an organic solvent for mixing; and (iii) dispersing each component to be incorporated in an organic solvent in advance and subsequently mixing with an organic solvent. The adhesive compositions may be heated before and after hardening to further facilitate hardening or post-hardening. Hardening of the adhesive compositions through an active energy beam yields a faster hardening speed at high temperature than at room temperature.

The cross-linkable compositions containing the addition-modified block copolymer according to the present invention may be used as pressure-sensitive adhesive tapes and labels. Pressure-sensitive adhesive tapes comprise a substrate such as a plastic film or paper to which a cross-linkable composition is applied to form an adhesion layer. In this use, no particular limitation is imposed on the substrate. The pressure-sensitive adhesive tapes may further contain a variety of other layers for production thereof such as a undercoating layer or a peeling coating layer, or may be incorporated with another coating material. The adhesive tape which contains no tackifier and is formed exclusively of the addition-modified block copolymer according to the present invention may be used as an adhesive for the purpose of preventing paper from tearing and molded products from breaking.

The cross-linkable compositions containing the addition-modified block copolymer according to the present invention may be used as a coating composition. In this use, a variety of fillers and pigments are incorporated into a cross-linkable composition. The incorporation enhances weather resistance and durability of the coating film obtained from the composition. Examples of appropriate fillers include calcium carbonate, clay, talc, zinc oxide, and titanium oxide. Incorporation of a pigment may also improve weather resistance and decomposition resistance of the coating films, and examples of the pigments include carbon black, zinc oxide, and titanium oxide. The incorporation amount of the fillers depends on the species thereof and use of the coating composition, and they are added in an amount of 0–70 wt. % based on an addition-modified block copolymer.

The addition-modified block copolymer of the present invention may be used as a coating composition in the form of a solution obtained by dissolving in a solvent. In this case, no particular limitation is imposed on the solvent so long as it is able to dissolve or disperse the block copolymer. Specific examples of the solvent include aromatic hydrocarbons such as benzene, toluene, or xylene; alcohols such as methanol, ethanol, or 2-propanol; ketones such as acetone, methyl ethyl ketone, or methyl isobutyl ketone; ethers such as diethyl ether, dibutyl ether, or dioxane; esters such as ethyl acetate, isobutyl acetate, ethylene glycol monoacetate, propylene glycol monoacetate, or dipropylene glycol monoacetate; ethylene glycol monoalkyl ethers; diethylene glycol monoalkyl ethers; ethylene glycol dialkyl ethers; diethylene glycol dialkyl ethers such as diethylene glycol dimethyl ether or diethylene glycol diethyl ether; ethylene glycol monoalkyl ether acetates; diethylene glycol monoalkyl ether acetates; amides such as dimethylformamide or dimethylacetamide; and halohydrocarbons such as tetrachlorocarbon or chloroform.

These solvents may be used singly or in combination of two or more species. The amount of the solvents varies depending on factors such as solvent species, use of the coating, or the amount of a functional group in the addition-modified block copolymer. Usually, the amount of solvent contained in the coating solution is determined within the range of 0–80 wt. %.

The coating solutions containing the addition-modified block copolymer(s) according to the present invention may be applied to an object through a method such as brush-coating, spray-coating, dip-coating, spin-coating, or curtain-coating, depending on the shape, structure, and scale of the object. Furthermore, to the coating compositions of the present invention, there may be added leveling agents, defoaming agents, thickeners, precipitation-preventing agents, antistatic agents, antifogging agents, antioxidants, photo-stabilizers, and UV-absorbing agents, as desired.

Examples of the antioxidants include those of hindered phenol, phosphite, and thioether, and examples of commercially available antioxidants include Adeka-Stab AO-60, AO-80, PEP-8, PEP-36, HP-10, and AO-412S (products of Asahi Denka Kogyo K.K.) and zinc dialkyldithiocarbamate. These may be used singly or in combination. The addition amount of the antioxidants may generally be selected within the range of 0.05–5 wt. % in the composition.

Examples of the photo-stabilizers and UV-absorbing agents include those of hindered amine, benzotriazole, and benzophenone, and examples of commercially available photo-stabilizer include Adeka-Stab LA-32, LA-36, LA-51, LA-52, LA-62, LA-63, and LA-77 (products of Asahi Denka Kogyo K.K.). Examples of the UV-absorbing agents include those containing a metal. These may be used singly or in combination. The addition amount of the photo-stabilizers and UV-absorbing agents may generally be selected in the range of 0.05–10 wt. % in the composition.

EXAMPLES

The present invention will next be described in detail by way of Examples and Comparative Examples, to which the invention is in no way limited unless the scope of the invention is surpassed.

In the present description, "part" and "%" are based on weight.

In Examples described below, measurement of the epoxy equivalent of epoxy-modified block copolymers and quantitative determination of side chains in addition-modified block copolymers were performed through methods described below.

(1) Measurement of the epoxy equivalent of polymers: Samples were dissolved in chloroform/chlorobenzene (weight ratio 50/50) and were then subjected to titration in accordance with ASTM D1652-88.

(2) Quantitative determination of the amount of side chains in block copolymers: The amount was determined through calculation on the basis of the area of the peak near 2.8 ppm attributed to an epoxy group and that near 6.0 ppm attributed to a (meth)acryloyl group by $^1$H-NMR (by use of "GXS270WB," JEOL Ltd.).

Example 1

Production of an epoxy-modified block copolymer

A polystyrene-polybutadiene-polystyrene block copolymer (product of Japan Synthetic Rubber Co., Ltd., trade name: TR2000) (300 g) and ethyl acetate (1500 g) were placed in a 3-liter-reactor equipped with a stirrer, a reflux condenser, a thermometer, a jacket, etc. and dissolved. Subsequently, the mixture was heated to 40° C., and a 30 wt. % ethyl acetate solution (169 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 530.

Addition of an acryloyl group

The obtained epoxy-modified block copolymer was dissolved in toluene (1 liter) to provide a solution. Acrylic acid (40.5 g) and triphenyl phosphite (6.5 g) were added to the solution, and the mixture was allowed to react at 100° C. for eight hours. After reaction was completed, the reaction mixture was cooled to ambient temperature, and the reaction product was recovered from the reactor. A polymer was precipitated by adding a large amount of methanol to the reaction product, separated by filtration, washed with water, and dried, to thereby obtain a block copolymer A having acryloyl groups in side chains. Quantitative analysis of an epoxy group in the block copolymer A indicated no residual epoxy group. The amount of side chains per gram of block copolymer A was 1.8 mg-equivalents.

Example 2

Production of an epoxy-modified block copolymer

A polystyrene-polybutadiene-polystyrene block copolymer (the same product as used in Example 1) (300 g) and ethyl acetate (1500 g) were placed in the same type of reactor as used in Example 1 and dissolved. The mixture was heated to 40° C., and a 30 wt. % ethyl acetate solution (43 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 2010.

Addition of an acryloyl group

The obtained epoxy-modified block copolymer (200 g) was dissolved in ethyl acetate (1 liter) to provide a solution. Acrylic acid (10.5 g) and triphenyl phosphite (2.5 g) were added to the solution, and the mixture was allowed to react at 75° C. for eight hours. After reaction was completed, the reaction mixture was cooled to ambient temperature, and the reaction product was recovered from the reactor. A polymer was precipitated by addition of a large amount of methanol to the reaction product, separated by filtration, washed with water, and dried, to thereby obtain a block copolymer B having acryloyl groups in side chains. Quantitative analysis of an epoxy group in the block copolymer B indicated no residual epoxy group. The amount of side chains per gram of block copolymer B was 4.9 mg-equivalents.

Example 3

Production of an epoxy-modified block copolymer

A polystyrene-polybutadiene-polystyrene block copolymer (product of Japan Synthetic Rubber Co., Ltd., trade name: TR2400) (300 g) and ethyl acetate (1500 g) were placed in the same type of reactor as used in Example 1 and dissolved. Subsequently, the mixture was heated to 40° C., and a 30 wt. % ethyl acetate solution (113 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 710.

Addition of an acryloyl group

The obtained epoxy-modified block copolymer was dissolved in toluene (1 liter) to provide a solution. Acrylic acid (25.5 g) and triphenyl phosphite (3.5 g) were added to the solution, and the mixture was allowed to react at 75° C. for eight hours. After reaction was completed, the reaction mixture was cooled to ambient temperature, and the reaction product was recovered from the reactor. A polymer was precipitated by addition of a large amount of methanol to the reaction product, separated by filtration, washed with water, and dried, to thereby obtain a block copolymer C having acryloyl groups in side chains. Quantitative analysis of an epoxy group in the block copolymer C indicated no residual epoxy group. The amount of side chains per gram of block copolymer C was 1.4 mg-equivalents.

Example 4

Production of an epoxy-modified block copolymer

A polystyrene-polybutadiene-polystyrene block copolymer (product of Shell Chemical Co., Ltd., trade name: Cariflex D1122) (300 g) and cyclohexane (1500 g) were placed in the same type of reactor as used in Example 1 and dissolved. Subsequently, the mixture was heated to 40° C., and a 30 wt. % ethyl acetate solution (177 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 490.

Addition of an acryloyl group

The obtained epoxy-modified block copolymer (200 g) was dissolved in ethyl acetate (1 liter) to provide a solution. Acrylic acid (42.0 g) and triphenyl phosphite (7.0 g) were added to the solution, and the mixture was allowed to react at 75° C. for eight hours. After reaction was completed, the reaction mixture was cooled to ambient temperature, and the reaction product was recovered from the reactor. A polymer was precipitated by addition of a large amount of methanol to the reaction product, separated by filtration, washed with water, and dried, to thereby obtain a block copolymer D having acryloyl groups in side chains. Quantitative analysis of an epoxy group in the block copolymer D indicated no residual epoxy group. The amount of side chains per gram of block copolymer D was 2.0 mg-equivalents.

Example 5
Production of an epoxy-modified block copolymer

A polystyrene-polyisoprene-polystyrene block copolymer (product of Shell Chemical Co., Ltd., trade name: Cariflex TR1111) (300 g) and cyclohexane (1500 g) were placed in the same reactor as used in Example 1 and dissolved. Subsequently, the mixture was heated to 40° C., and a 30 wt. % ethyl acetate solution (170 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 510.

Addition of an acryloyl group

The obtained epoxy-modified block copolymer (200 g) was dissolved in toluene (1 liter) to provide a solution. Acrylic acid (41.0 g) and triphenyl phosphite (6.7 g) were added to the solution, and the mixture was allowed to react at 75° C. for eight hours. After reaction was completed, the reaction mixture was cooled to ambient temperature, and the reaction product was recovered from the reactor. A polymer was precipitated by addition of a large amount of methanol to the reaction product, separated by filtration, washed with water, and dried, to thereby obtain a block copolymer E having acryloyl groups in side chains. Quantitative analysis of an epoxy group in the block copolymer E indicated no residual epoxy group. The amount of side chains per gram of block copolymer E was 1.9 mg-equivalents.

Example 6
Production of an epoxy-modified block copolymer

A polystyrene-polyisoprene block copolymer (product of Kuraray Co., Ltd., trade name: LIR310) (300 g) and ethyl acetate (1500 g) were placed in the same type of reactor as used in Example 1 and dissolved. Subsequently, the mixture was heated to 40° C., and a 30 wt. % ethyl acetate solution (113 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 490.

Addition of an acryloyl group

The obtained epoxy-modified block copolymer (200 g) was dissolved in ethyl acetate (1 liter) to provide a solution. Acrylic acid (25.5 g) and triphenyl phosphite (3.5 g) were added to the solution, and the mixture was allowed to react at 75° C. for eight hours. After completion of reaction, ethyl acetate was removed by use of an evaporator under reduced pressure, and further the solvent was removed by means of a vacuum dryer, to thereby obtain a block copolymer F having acryloyl groups in side chains. Quantitative analysis of an epoxy group in the block copolymer F indicated no residual epoxy group. The amount of side chains per gram of block copolymer F was 1.9 mg-equivalents.

Example 7
Production of an epoxy-modified block copolymer

A polystyrene-polybutadiene-polystyrene block copolymer (the same product as used in Example 1) (300 g) and cyclohexane (3000 g) were placed in a 5-liter reactor equipped with a stirrer, a thermometer, a jacket, etc. and dissolved. Subsequently, the mixture was heated to and maintained at 60° C., and a mixture of hydrogenation catalysts, i.e., di-p-tolylbis(1-cyclopentadienyl)titanium/ cyclohexane solution (40 ml, concentration: 1 mmol/l) and n-butyllithium solution (8 ml, concentration: 5 mmol/l) was added thereto at 0° C. under a hydrogen pressure of 2.0 $kg/cm^2$ with stirring to cause reaction for 30 minutes under a partial hydrogen pressure at 2.5 $kg/cm^2$. From the obtained partially hydrogenated polymer solution, the solvent was removed under reduced pressure. The hydrogenation ratio of the entirety of the butadiene contained in the obtained hydrogenated block copolymer was 30%.

The partially hydrogenated polymer solution obtained according to the above-mentioned method (300 g) and cyclohexane (3000 g) were placed in the same type of reactor as used in Example 1 and dissolved. The mixture was heated to 40° C., and a 30 wt. % ethyl acetate solution (220 g) of peracetic acid was continuously added dropwise to the reactor over three hours under stirring to cause epoxidation while the mixture was maintained at the temperature. After reaction was completed, the resultant reaction mixture was neutralized with an aqueous alkaline solution, and a polymer was precipitated by addition of methanol. The polymer has an epoxy equivalent of 380.

Addition of an acryloyl group

The obtained epoxy-modified block copolymer (200 g) was dissolved in ethyl acetate (1 liter) to provide a solution. Acrylic acid (62 g) and triphenyl phosphite (9.0 g) were added to the solution, and the mixture was allowed to react at 75° C. for ten hours. After reaction was completed, the reaction mixture was cooled to ambient temperature, and the reaction product was recovered from the reactor. A polymer was precipitated by addition of a large amount of methanol to the reaction product, separated by filtration, washed with water, and dried, to thereby obtain a block copolymer G having acryloyl groups in side chains. Quantitative analysis of an epoxy group in the block copolymer G indicated no residual epoxy group. The amount of side chains per gram of block copolymer G was 2.6 mg-equivalents.

Example 8

To the block copolymer A (100 g) described in Example 1 were added dioctyl phthalate (60 g), NK Ester TMPT (product of Shin-Nakamura Chemical Co., Ltd.) (30 g), and benzophenone (5 g) to prepare a sealant composition. The sealant composition was applied onto a stainless steel plate, followed by irradiation by use of a UV irradiation apparatus (product of Eyegraphic Co., Ltd. equipped with a high pressure mercury lamp; 120 W/cm; irradiation distance: 10 cm; conveyer speed: 7 m/min; three repetitions of irradiation). The obtained hardened film was not peeled off under a cross-cut test, providing a coating film having a Du Pont impact strength of 20 (½ inch, 300 g).

Example 9

The block copolymer E (100 g) obtained in Example 5, Arcon M-115 (Arakawa Chemical Co., Ltd.) (100 g), Shellflex 371N, a naphthene oil (25 g), methyl amyl ketone peroxide (1 g), and NK Ester TMPT (product of Shin Nakamura Chemical Co., Ltd.) (25 g) were dissolved in toluene (200 g) to prepare an adhesive composition. The adhesive composition was applied onto a polyethylene terephthalate film (thickness: 25μ) and dried, followed by UV irradiation to obtain an adhesive film. The adhesive film was caused to adhere onto a polypropylene film through roll-pressing under a pressure of 2 $kg/cm^2$ at 100° C. The obtained composite film had a peel strength of 3 $kg/cm^2$ and endured a load of 500 g up to 110° C.

Example 10

The block copolymer G (30 g) obtained in Example 7, NK Ester A-BPE-4 (product of Shin-Nakamura Chemical Co., Ltd.) (70 g), talc (20 g), carbon black (0.2 g), and Irgacure 500 (product of Chiba-Geigy) (4 g) were mixed to prepare a coating composition. The obtained coating composition was applied onto a polyethylene terephthalate film, followed by UV hardening by use of a UV irradiation apparatus (product of Eyegraphic Co., Ltd. equipped with a high pressure mercury lamp; 120 W/cm; irradiation distance: 10 cm; conveyer speed: 10 m/min; two repetitions of irradiation). The obtained coating film was folded in two for observation of bending, resulting in no cracks in the coating film.

Industrial Applicability

The present invention provides particularly advantageous effects as described below and thus its value in industrial use is significantly high.

1. The block copolymers having (meth)acryloyl groups in side chains (i.e., addition-modified block copolymers) according to the present invention are characterized in that they undergo cross-linking when irradiated with active energy beams such as U.V. rays or electron beams and/or that they are chemically cross-linkable, and therefore, through addition of a variety of additives to the addition-modified block copolymers in accordance with uses, the copolymers can be used for forming adhesive compositions, sealant compositions, or coating compositions.

2. When the compositions prepared by incorporating a variety of additives into the addition-modified block copolymers of the present invention are applied to or laminated on the surface of paper, metal, plastics, etc., there can be obtained hardened coating film which has excellent properties in terms of adhesion, solvent resistance, and gloss.

3. The above compositions can be applied in a broad range of uses including pressure-sensitive adhesive tapes and labels having adhesive layers, paints, metal—metal bond molded products, metal-plastics (rubber) complex molded products, plastics (rubber)-plastics complex molde products, etc.

What is claimed is:

1. A block copolymer having (meth)acryloyl groups in side chains, which copolymer is a ring-opening addition product of (meth)acryloyl-group-containing carboxylic acid to epoxy groups of a block copolymer obtained through epoxidation of double bonds derived from a conjugated diene compound contained in a base block copolymer formed of a polymer block of an aromatic vinyl compound and that of a conjugated diene compound.

2. A block copolymer having (meth)acryloyl groups in side chains according to claim 1, wherein the conjugated diene compound contained in the epoxidized block copolymer is butadiene and/or isoprene.

3. A block copolymer having (meth)acryloyl groups in side chains according to claim 1 wherein the epoxidized block copolymer has conjugated-diene-derived double bonds that are partially hydrogenated.

4. A block copolymer having (meth)acryloyl groups in side chains according to claim 1 wherein the epoxidized block copolymer is obtained by adding a (meth)acryloyl-group-containing carboxylic acid in an amount of 0.9–2.0 equivalents per equivalent of epoxy groups.

5. A block copolymer having (meth)acryloyl groups in side chains according to claim 1 wherein the (meth)acryloyl-group-containing carboxylic acid is selected from the compound group consisting of methacrylic acid, acrylic acid, 2-acryloyloxyethyl hydrogen phthalate, 2-acryloyloxypropyl hydrogen phthalate, 2-acryloyloxypropylhexahydro hydrogen phthalate, 2-acryloyloxypropyltetrahydro hydrogen phthalate, β-methacryloyloxyethyl hydrogen succinate, β-acryloyloxyethyl hydrogen succinate, and compounds represented by the following formulas (1) and (2):

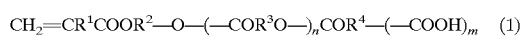

{wherein $R^1$ represents hydrogen or a methyl group; each of $R^2$, $R^3$, and $R^4$ represents a $C_{1-10}$ aliphatic hydrocarbon group; and each of m and n represents an integer between 1 and 10 inclusive}.

6. A block copolymer having (meth)acryloyl groups in side chains according to claim 1, wherein the (meth)acryloyl-group-containing carboxylic acid is monocarboxylic acid.

7. An adhesive composition characterized by containing a block copolymer having (meth)acryloyl groups in side chains as described in claim 1.

8. A sealant composition characterized by containing a block copolymer having (meth)acryloyl groups in side chains as described in claim 1.

9. A coating composition characterized by containing a block copolymer having (meth)acryloyl groups in side chains as described in claim 1.

10. A sizing composition characterized by containing a block copolymer having (meth)acryloyl groups in side chains as described in claim 1.

* * * * *